(12) United States Patent
McCormick

(10) Patent No.: US 11,428,476 B2
(45) Date of Patent: Aug. 30, 2022

(54) THERMAL ENERGY STORAGE AND RETRIEVAL SYSTEM

(71) Applicant: Photon Vault, LLC, San Ramon, CA (US)

(72) Inventor: Kentwell Lee McCormick, San Ramon, CA (US)

( * ) Notice: Subject to any disclaimer, the term of this patent is extended or adjusted under 35 U.S.C. 154(b) by 0 days.

(21) Appl. No.: 17/012,621

(22) Filed: Sep. 4, 2020

(65) Prior Publication Data

US 2022/0074676 A1 Mar. 10, 2022

(51) Int. Cl.
*F28D 17/02* (2006.01)
*F28D 20/00* (2006.01)

(52) U.S. Cl.
CPC .......... *F28D 17/02* (2013.01); *F28D 20/0056* (2013.01); *F28D 2020/0065* (2013.01); *F28D 2020/0069* (2013.01)

(58) Field of Classification Search
CPC .......................... F28D 17/02; F28D 2020/0065
See application file for complete search history.

(56) References Cited

U.S. PATENT DOCUMENTS

| | | | | |
|---|---|---|---|---|
| 3,626,149 A | * | 12/1971 | Carney | E01C 7/145 165/45 |
| 3,981,294 A | | 9/1976 | Deminet | |
| 4,114,599 A | | 9/1978 | Stephens | |
| 4,117,831 A | | 10/1978 | Bansal | |
| 4,200,148 A | * | 4/1980 | Friefeld | F28D 20/021 165/10 |
| 4,210,201 A | * | 7/1980 | O'Hanlon | F28D 20/0052 165/10 |
| 4,257,398 A | | 3/1981 | Watson | |
| 4,257,481 A | * | 3/1981 | Dobson | F24S 20/66 165/45 |
| 4,373,513 A | | 2/1983 | Materna | |
| 5,069,199 A | * | 12/1991 | Messner | F24S 10/75 165/10 |
| 9,612,064 B2 | * | 4/2017 | Langer | B32B 9/007 |
| 9,932,830 B2 | | 4/2018 | Laughlin | |
| 10,288,357 B2 | | 5/2019 | Laughlin et al. | |
| 2006/0272796 A1 | * | 12/2006 | Asmussen | F28F 21/02 165/53 |
| 2008/0156314 A1 | | 7/2008 | Heuer | |

(Continued)

FOREIGN PATENT DOCUMENTS

| | | |
|---|---|---|
| CA | 3019409 A1 | 3/2020 |
| CN | 202734275 U | 2/2013 |

(Continued)

OTHER PUBLICATIONS

U.S. Appl. No. 16/928,352, filed Jul. 14, 2020, Multi-Temperature Heat Pump for Thermal Energy Storage.

(Continued)

*Primary Examiner* — Leonard R Leo
(74) *Attorney, Agent, or Firm* — Davis Malm D'Agostine P.C.; David J. Powsner

(57) ABSTRACT

The invention provides, in some aspects, a thermal storage system that has one or more fluid-transport vias that contain a heat transfer fluid and that are disposed in thermal coupling with a form of graphite, e.g., expanded graphite. The graphite form is, in turn, disposed in thermal coupling with a bonded aggregate material.

7 Claims, 4 Drawing Sheets

(56) References Cited

U.S. PATENT DOCUMENTS

| | | | |
|---|---|---|---|
| 2009/0095282 A1 | 4/2009 | Cramer | |
| 2010/0314081 A1 | 12/2010 | Reis | |
| 2011/0290153 A1* | 12/2011 | Abdullah | C04B 12/005 524/2 |
| 2012/0060501 A1 | 3/2012 | Hemrle | |
| 2012/0199331 A1* | 8/2012 | Maurer | F28D 7/024 165/172 |
| 2012/0312292 A1* | 12/2012 | Bahl | F24D 3/148 165/10 |
| 2014/0060051 A1 | 3/2014 | Ohler | |
| 2016/0108761 A1* | 4/2016 | Frazier | F01K 25/06 60/659 |
| 2016/0160864 A1 | 6/2016 | Becquin | |
| 2017/0275190 A1 | 9/2017 | Eziyi | |
| 2019/0331098 A1* | 10/2019 | von Behrens | F01K 3/08 |
| 2020/0166290 A1* | 5/2020 | Gattuso | F28D 20/0034 |

FOREIGN PATENT DOCUMENTS

| | | | | |
|---|---|---|---|---|
| CN | 210154394 U | 3/2020 | | |
| DE | 10341299 A1 * | 3/2005 | | C04B 38/08 |
| DE | 102009014235 A1 | 9/2010 | | |
| EP | 2241737 | 6/2015 | | |
| JP | H11-294983 A | 10/1999 | | |
| JP | 2001-66081 A | 3/2001 | | |
| JP | 2007-85672 A | 4/2007 | | |
| WO | WO-2012114229 A1 * | 8/2012 | | C01B 3/0005 |
| WO | WO 2012/140015 A1 | 10/2012 | | |
| WO | WO-2012140015 A1 * | 10/2012 | | F28D 20/0056 |
| WO | WO 2015/129456 A1 | 9/2015 | | |

OTHER PUBLICATIONS

U.S. Appl. No. 16/945,281, filed Jul. 31, 2020, Thermal Energy Storage and Retrieval Systems and Methods.
U.S. Appl. No. 17/093,063, filed Nov. 9, 2020, Multi-Temperature Heat Collection System.
International Search Report dated Sep. 13, 2021 in PCT/US2021/039287.
"Designing a novel solar-assisted heat pump system with modification of a thermal energy storage unit", Proceedings of the Institution of Mechanical Engineers Part A Journal of Power and Energy, May 2019.
"Using Sand and other Small Grained Materials as Heat Storage Medium in a Packed Bed HTTESS", Schlipf et al., Energy Procedia, v. 69, pp. 1029-1038 (2015).
"The Rayleigh-Benard problem in extremely confined geometries with and without the Soret effect," Platten et al., Comptes Rendus Mecanique, Elsevier Masson, 2007, 335 (9-10), pp. 638-654.10.1016/j.crme.2007.08.011.hal-01946148.
Chemistry and Physics of Carbon, v. 1, Editor: Peter Thrower, Publ: Marcel Dekker, Inc. (1989) pp. 1-6.
Encyclopedic Dictionary of Condensed Matter Physics, v. 1, Charles P. Poole, Elsevier Ltd. (2004), pp. 530-533.
The Physical Chemistry of Materials—Energy and Environmental Applications (2010), Roque-Malherbe, CRC Press. pp. 86-88.
The Structure and Properties of Artificial and Natural Graphite, Neubert, et al., Argonne National Laboratory (1955) pp. 18-24.
International Search Report dated Dec. 8, 2021 for PCT/US21/39288, 7 pages.
International Search Report dated Dec. 14, 2021 for PCT/US21/39290, 20 pages.
Search Report and the Written Opinion dated Nov. 5, 2021 in PCT/US2021/039289.
American Heritage Dictionary, 2nd Edition (1984), at p. 573.
Bernal, "The Structure of Graphite," Proceedings of the Royal Society of London. Series A, Containing Papers of a Mathematical and Physical Character, vol. 106, Issue 740, at pp. 749-773 (1924).
Bodzenta, "Thermal Properties of Compressed Expanded Graphite: Photothermal Measurements," Appl Phys B 105:623-630 (2011).
McEnaney, "Structure and Bonding in Carbon Materials," in Carbon Materials for Advanced Technologies (1999).
Brown, "Sodium Silicate Bonded Sand," Foseco Ferrous Foundryman's Handbook (Eleventh Edition), pp. 204-215 (2000).

* cited by examiner

THERMAL ENERGY STORAGE AND RETRIEVAL SYSTEM

BACKGROUND OF THE INVENTION

The invention relates to thermal energy storage. It has application to heat pumps and other systems that rely on the storage of thermal energy.

Energy storage is a critical capability for regulating the energy supply. For example, heat pumps that take advantage of renewable energy sources must accommodate a supply that is often intermittent and provides either too little or too much power relative to demand. Leveling out the supply of energy requires a mechanism to store and retrieve energy. For example, in industrial, and commercial and residential heat pumps there is a need for energy storage when excess thermal or electrical energy is available (e.g., during daylight hours) and for energy retrieval (e.g., during evening hours) when energy is needed for heating.

Sand has been proposed as a medium of thermal energy storage. See, for example, Schlipf et al, "Using Sand and other Small Grained Materials as Heat Storage Medium in a Packed Bed HTTESS," *Energy Procedia*, v. 69, pp. 1029-1038 (2015). Sand and the like have superior specific heat capacity and, as discussed by authors of that article, can be obtained cheaply. However, sand does not have good thermal conductivity, leading to inefficiency in heat storage and retrieval.

An object of the invention is to provide improved systems and methods for thermal energy storage.

A related object is to provide such improved systems and methods as can be used in thermal stores for heat pumps and other thermal energy systems.

A still further object of the invention is to provide such improved systems and methods as are economical and efficient.

SUMMARY OF THE INVENTION

The foregoing are among the objects attained by the invention which provides, in some aspects, a thermal storage system that has one or more fluid-transport vias that contain a heat transfer fluid and that are disposed in thermal coupling with a form of graphite, e.g., expanded graphite. The graphite form is, in turn, disposed in thermal coupling with a bonded aggregate material.

Related aspects of the invention provide a thermal storage system, e.g., as described above, in which the vias are disposed adjacent to and in thermal coupling with a layer of the expanded graphite or graphite form.

Further related aspects of the invention provide a thermal storage system, e.g., as described above, in which the layer of expanded or other graphite form is disposed adjacent to and in thermal coupling with a layer of the bonded aggregate material.

Still further related aspects of the invention provide a thermal storage system, e.g., as described above, in which the layers of the graphite form and/or bonded aggregate materials are compacted.

Yet further related aspects of the invention provide a thermal storage system, e.g., as described above, in which the vias comprise stainless steel and/or the heat transfer fluid comprises any of carbon dioxide, a eutectic mixture, heat transfer oils, perfluoropolyether (PFPE), hydrocarbons and/or refrigerant gases.

Other related aspects of the invention provide a thermal storage system, e.g., as described above, in which the bonded aggregate comprises concrete and/or a composite of sand and sodium metasilicate. In further related aspects, the bonded aggregate layer comprises perforations that extend obliquely through the respective layer.

The invention provides, in other aspects, methods of operating and/or fabricating a thermal store, e.g., of the type described above. One such method includes placing one or more fluid-transport vias in thermal contact with a form of graphite and, in turn, placing the graphite form in thermal contact with a bonded aggregate, such as, for example, concrete or a composite of sand and sodium metasilicate.

Related aspects of the invention provide a method, e.g., as described above, in which the graphite form and the aggregate comprise layers and, according to related aspects of the invention, compacted layers.

Still further related aspects of the invention provide methods, e.g., as described above, that include passing heated carbon dioxide through the one or more vias.

These and other aspects of the invention are evident in the text that follows and in the drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
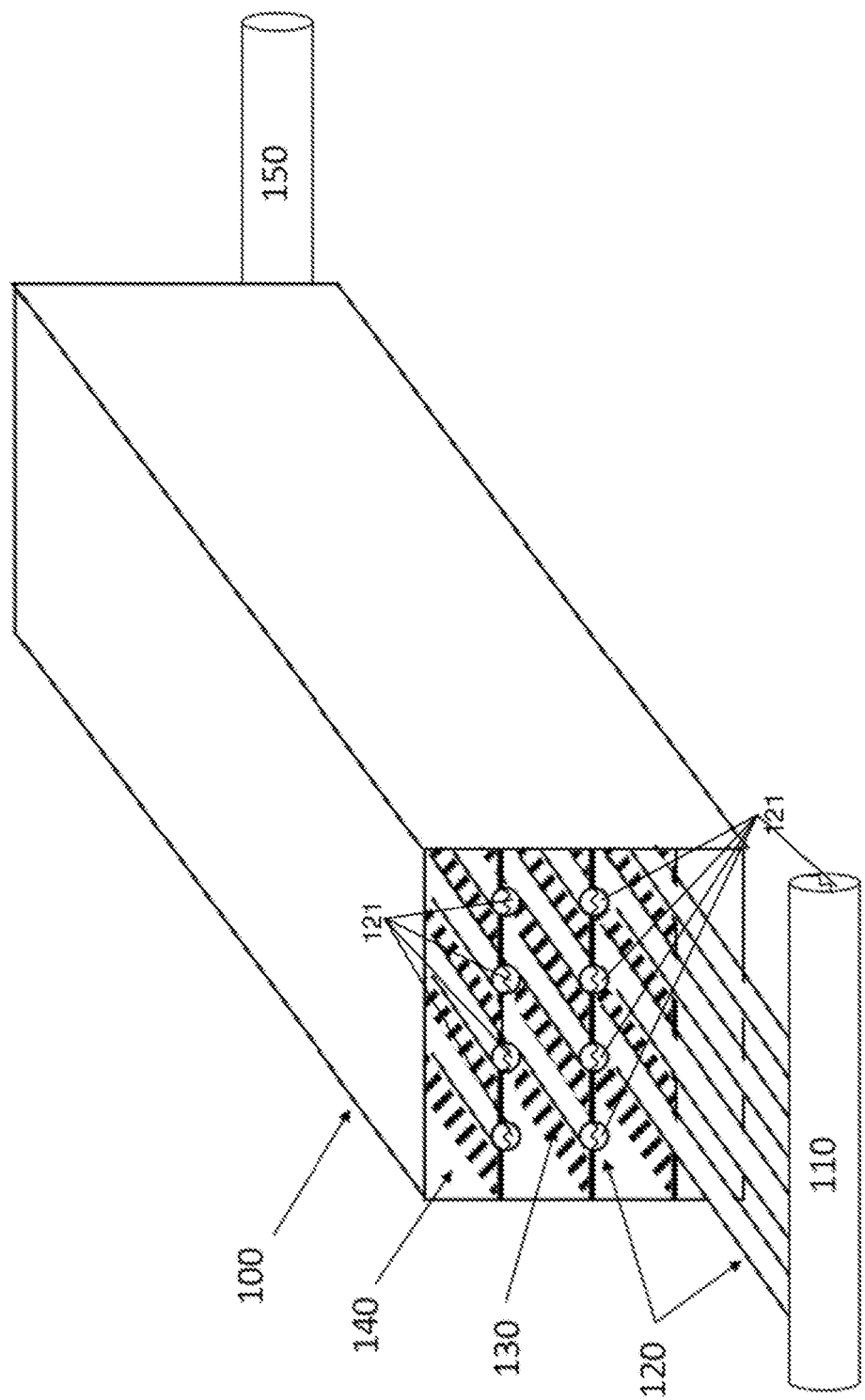
FIG. 1 depicts a thermal energy storage system according to one practice of the invention.

Energy storage systems according to the invention consume heat from a heat transfer fluid and distribute that heat, using a heat "sink" such as a layer of expanded graphite, throughout a bulk medium of bonded aggregate material such as sand. The systems can take advantage of (i) the improved thermal conductivity of the bonded aggregate over the aggregate alone, yet, without the loss of thermal mass of the aggregate, and (ii) the superior thermal conductivity of the graphite heat spreader over the bonded aggregate. With respect to the latter, some embodiments take additional advantage of the still further improved conductivity of a heat spreader composed of graphite that has been expanded and compressed perpendicular to the plane of thermal conduction.

Systems according to the invention store and retrieve thermal energy quickly. Additional advantages include their absorption of large quantities of heat, even when there are small temperature differences between the heat source and the storage system. Moreover, heat can be extracted from the systems for a long period of time at near the charging temperature. These characteristics are desirable, by way of non-limiting example, for energy production from heat engines, which can produce more power when temperature are higher.

Systems according to the invention have application, by way of non-limiting example, in industrial, commercial and residential heat pumps and other apparatus that benefit from energy storage when excess thermal or electrical energy is available (e.g., during the daylight or off-peak hours) and from energy retrieval when energy is needed for heating or electricity production (e.g., during evening or peak hours).

Described below and shown in the drawings are embodiments of the invention having heat transfer fluid vias, heat spreader layers and bonded aggregate layers. It will be appreciated that this is by way of example and that other embodiments may utilize different bonded aggregated materials, different heat transfer fluids and vias, different heat spreader materials and/or different geometrical arrangements of vias, sinks and/or aggregates, whether layered or otherwise, all in accord with the spirit of the teachings hereof. Furthermore, multiple systems of the types shown and described here (or variants of those systems) may be combined in series or parallel or any combination thereof to extract and store heat from a common thermal energy source or from multiple disparate such sources and/or to discharge stored heat to a common thermal energy destination or to multiple disparate such destinations.

FIG. 1 is a perspective view of a heat store according to the invention including a housing 100, inside of which is disposed bonded aggregate medium 140 and extending through which medium 140, as shown, are fluid-transport vias 120 and heat spreader(s) 130. The heat spreader(s) 130 are in thermal contact with the vias 120 and with bonded aggregate medium 140 for purposes of transferring heat between them.

Figure 5:
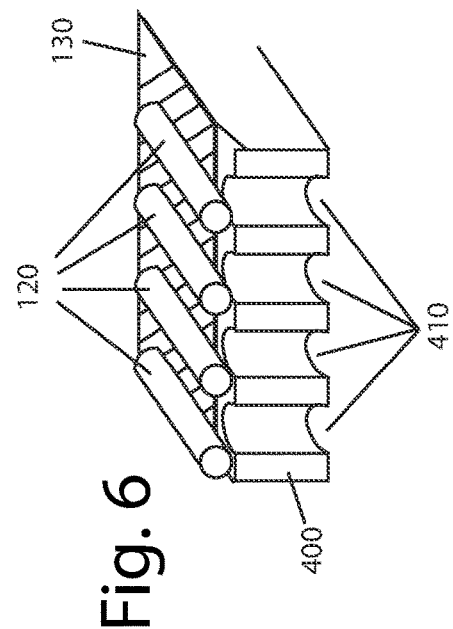
FIG. 5 is a cross-sectional view of the thermal energy storage system of FIG. 1.

FIG. 5 is a cross-sectional view of the heat store of FIG. 1 depicting the housing 100, bonded aggregate medium 140, fluid-transport vias 120 and heat spreader(s) 130.

A flow of heat transfer fluid through the vias 120 is supported by headers 110 and 150. Though only one pair of headers 110, 150 is shown in the drawing—to wit, in fluid coupling with vias 120 on a bottom layer of the housing 100 for purposes of supporting the flow of a heat-transfer fluid to (header 110) and from (header 150)—it will be appreciated that those headers 110, 150 may support the flow of heat transfer fluid with others of the illustrated vias 120 and/or that additional headers may be provided for that purpose.

The housing 100, which is shown here as being of square or other rectangular cross-section, may be of circular or other cross-section, whether or not regular. The housing may be fabricated of metal, plastic, ceramic, or other suitable material known in the art and may include, surround or be encased in insulative or other materials selected in accord with the environment in which the store is use, e.g., above- or below-grade, transportable or otherwise, all as is within the ken of those skilled in the art in view of the teachings hereof.

The heat transfer fluid 121 of the illustrated embodiment is carbon dioxide as it is non-toxic, non-flammable, and suitable for high temperature heat transfer and as a working fluid in heat engines. However, those skilled in the art will appreciate that other substances, such as a eutectic mixture, e.g., of biphenyl and diphenyl ether, heat transfer oils, perfluoropolyether (PFPE), hydrocarbons, refrigerant gases or other heat-transfer fluids of the type known in the art, the selection among which is within the ken of those skilled in the art in view of the teachings hereof for the temperatures, pressures and other operating conditions of the embodiment, may be used instead or or in addition to carbon dioxide.

Vias 120 and headers 110, 150 comprise conduits, headers, manifolds, piping, tubing or other structures (collectively, "tubes") of the type known in the art as adapted in accord with the teachings hereof to carry the heat transfer fluid 121 in its liquid and/or gas and/or supercritical phases through the storage system and its respective components as shown in the drawings and described herein. In the illustrated embodiment, the tubes are fabricated from stainless steel, though, other embodiments may use other metals, ceramics, plastics or composites thereof, all as is within the ken of those skilled in the art in view of the teachings hereof. Vias 120 reside wholly within the housing 100 or may protrude from it as shown, for example, in the case of the vias 120 on a bottom layer in FIG. 1 and as further shown in FIG. 3.

In addition to carrying the heat transfer fluid 121 and being thermally coupled to it, vias 120 are thermally coupled to heat spreader(s) 130 disposed within the housing, e.g., as shown in FIG. 1. In the illustrated embodiment, those heat spreader(s) 130 comprise one or more layers of expanded graphite powder, though, alternative embodiments may use of other graphite configurations and/or other compounds instead or in addition to graphite. Such thermal coupling is obtained in the illustrated embodiment by disposing the vias on and/or between layers of graphite 130 and applying force to the vias 120 and/or graphite layers 130 to insure robust contact. Alternatively, or in addition, the graphite layers 130 may be compacted before and/or after placement of the vias thereon or therebetween, all as is within the ken of those skilled in the art in view of the teachings hereof.

As noted, alternative embodiments may use heat spreader(s) 130 of configurations other than layered graphite powders. For example, in some such alternative embodiments, antenna-shaped or other dendritically-shaped graphite structures can be used as heat spreader(s) 130. These structures can be of small, particulate size or of larger size (e.g., from snowflake-sized or larger). Moreover, the structures can be layered in parallel with the layers of medium 140 discussed below or can extend obliquely from the vias 120 into those medium 140 layers, all as is within the ken of those skilled in the art in view of the teachings hereof.

In addition to being in thermal contact with the heat spreader(s) 130, the vias 120 can be in thermal contact with the bonded aggregate medium 140 that is also disposed within the housing 100, e.g., as shown in FIG. 1. As above, this can be achieved by disposing the vias 120 on or between layers of the medium 140 and applying force or compaction as described above vis-à-vis achieving thermal coupling between the vias 120 the heat spreader(s) 130.

In the illustrated embodiment, heat transfer between the vias 120 and the medium 140 is preferentially attained via the heat spreader(s) 130 and not via direct contact between the vias and that medium. To this end, heat spreader(s) 130 of the illustrated embodiment are in thermal coupling with the medium 140. In embodiments in which the heat spreader(s) 130 comprise graphite layers, such thermal coupling is achieved by disposing each layer of graphite on and in contact with the medium 140, which itself may be compressed and disposed in layers in housing 100, as shown in the drawing.

With this arrangement, as the heat transfer fluid 121 flows through each via 120 during the "charging" phase of operation of the store of FIG. 1, it transfers heat through the walls of the via to one or more graphite heat spreader layers 130 on/in between which that via is disposed and, in turn, to the bonded aggregate medium 140 on which those heat spreader layers 130 are disposed. Conversely, during discharging, heat from the bonded aggregate medium 140 is transferred through the graphite heat spreader layers 130 to the heat transfer fluid contained in the vias 120 through the walls thereof. In practice, whether a phase is a charging or discharging phase depends on the local temperature difference between the heat transfer fluid in via 120 and that of the graphite heat spreader layer 130 and bonded aggregate medium 140 adjacent it.

As noted above, the heat spreader graphite layer 130 thermally couples the heat transfer fluid 121 in vias 120 to the bonded aggregate (or "bulk") medium 140. In the illustrated embodiment, the graphite layer 130 is formed from graphite that has been processed into its "expanded" form a/k/a "expanded graphite"—a material with very low density. During fabrication of the illustrated system of FIG. 1, the expanded graphite 130 is compressed onto the bonded aggregate medium 140 to form a heat spreader layer with higher density. Compression, moreover, aligns the planes of graphite so that they are perpendicular to the direction of compression. When aligned in this way, the thermal conductivity in the plane perpendicular to the compression direction is much higher than in bulk graphite and can exceed the thermal conductivity of metallic materials. It is this property that enables the vias 120 to thermally couple with the bulk medium 140 by way of the graphite heat spreader layer 130.

The bulk medium 140 of the illustrated embodiment is a bonded aggregate material, particularly, bonded sand. This may be concrete (to wit, a mixture inter alia of sand and cement) or a composite formed from sand bonded with sodium metasilicate. In practice, such a composite is formed by mixing sodium metasilicate liquid with the sand and forming it into layers within the housing 100 in contact with the graphite heat spreader layers 130. Over an extended period of time, the sand/metasilicate mixture will harden. The hardening can be accelerated to just a few seconds by exposing the mixture to carbon dioxide gas. Unlike most binders, sodium metasilicate is a refractory material capable of handling temperatures in excess of 600 degrees Fahrenheit. Regardless of whether in concrete or a sodium silicate composite, the bonded aggregate has improved thermal conductivity over sand itself and it provides the requisite rigidity to enable compression with the graphite layers 130. Other embodiments of the invention may utilize bulk medium layers 140 that utilize, in lieu of sand, other aggregate materials of comparable heat capacity (e.g., stone) and/or that utilize, in lieu of cement or sodium metasilicate, other compounds to bond the sand or other aggregate material, all as is within the ken of those skilled in the art in view of the teachings hereof.

Figure 4:
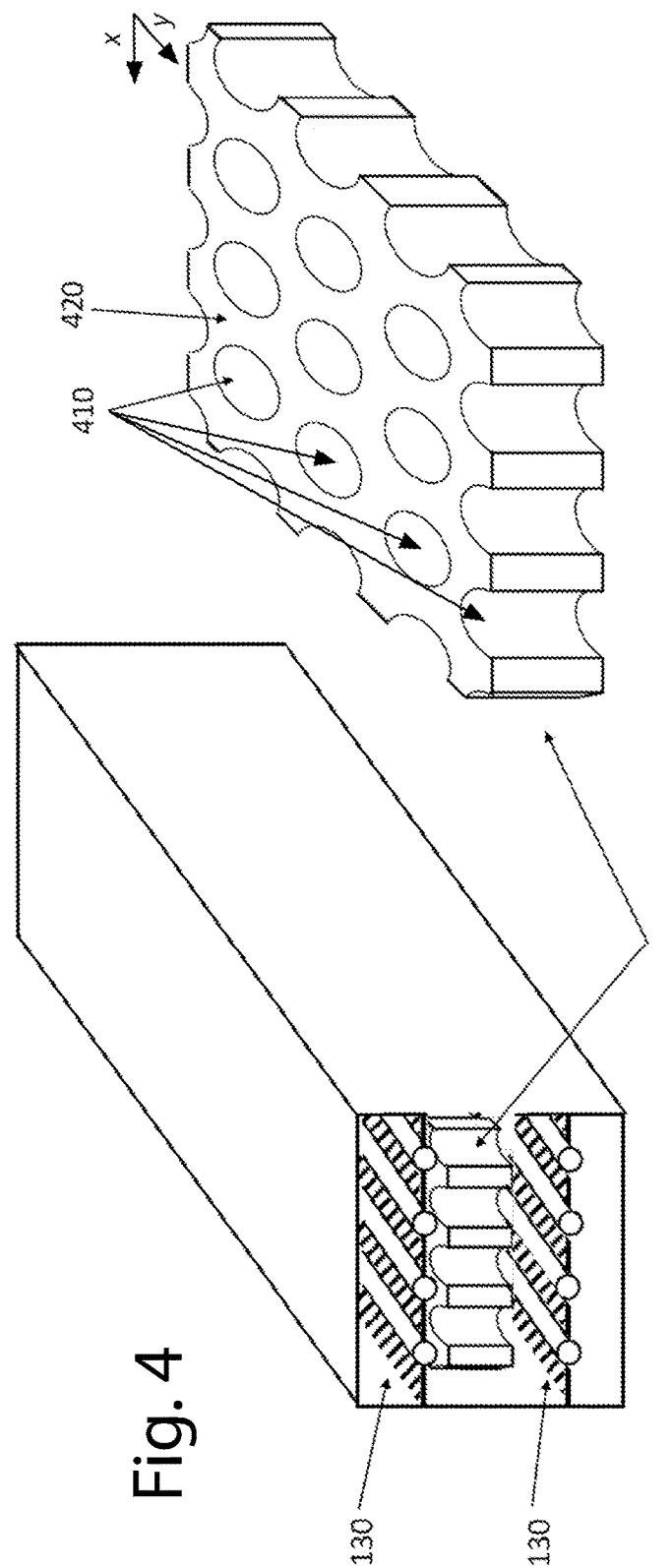
FIG. 4 depicts the system of FIG. 1 with a perforated sand layer in between aggregate medium and heat transfer layers.

In some embodiments, one or more of the bulk medium layers 140 is perforated as shown as item 400 of FIG. 4. Such a perforated layer 400 may be fabricated as discussed above, albeit with a (large) plurality of holes 410 that run obliquely (or, more particularly, for example, normal) to the plane of the respective layer 400 (which plane is connoted, here, by x-y axes)—or, put another way, holes that run from and between the layers 130 with which the perforated layer 400 is in physical contact.

Figure 6:
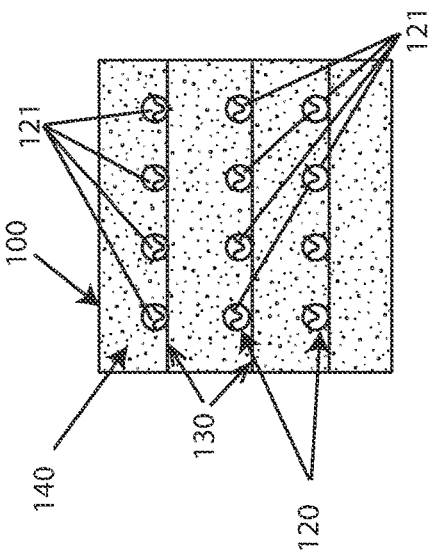
FIG. 6 is a perspective view of a bulk medium layer and the heat spreader and vias disposed adjacent thereto in an embodiment of the type shown in FIG. 4.

FIG. 6 is a perspective view of a bulk medium layer 400 and the heat spreader 130 and vias 120 disposed adjacent thereto in the embodiment of FIG. 4. Whereas the primary mechanism of heat transfer in the layers 140 is conduction, the primary mechanism of heat transfer in the perforated sand layer 400 is convection. Convective heat transfer enables much thicker layers of bulk sand while maintaining good heat transfer performance. The limit to the slab thickness is governed by the Rayleigh number. Critical values of the Rayleigh number for vertical cavities are known in the art, e.g., as described in Platten, et al, "The Rayleigh-Benard problem in extremely confined geometries with and without the Soret effect," Comptes Rendus Mécanique, Elsevier Masson, 2007, 335 (9-10), pp. 638-654. 10.1016/j.crme.2007.08.011. hal-01946148.

Figure 2:
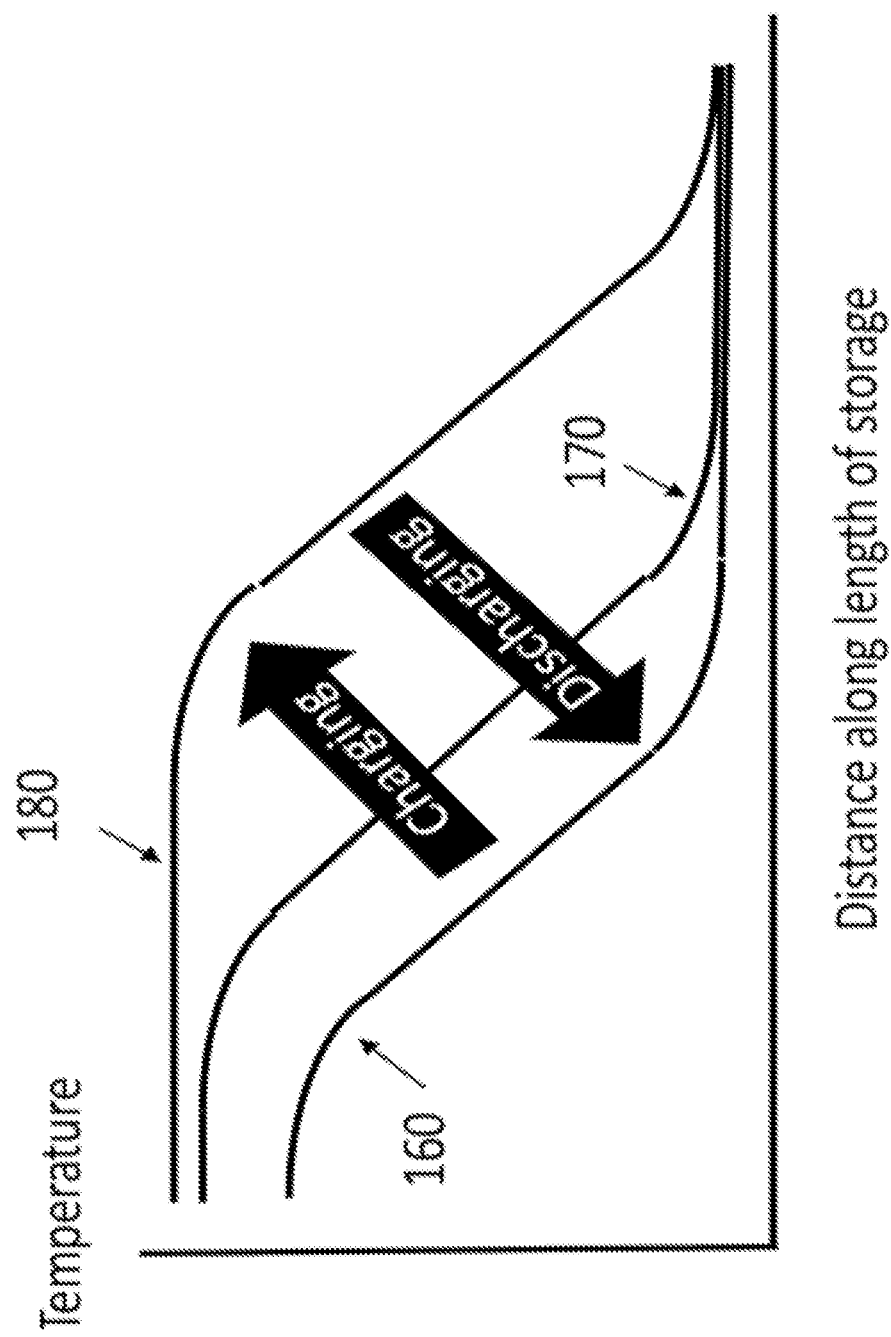
FIG. 2 depicts a thermal storage temperature profile of the system of FIG. 1.

FIG. 2 illustrates the typical thermal gradients that are seen in the heat storage system (or "store") of FIG. 1 during charging and discharging. The x-axis of the drawing corresponds to the traversal of the tubes from header 110 to vias 120 to header 150.

At the beginning of the charging cycle, the temperature profile is as illustrated as curve 160. The temperature near the inlet is high, but lower than the temperature of the heat transfer fluid 121. This enables heat to flow from the heat transfer fluid into the graphite heat spreader layer 130 and, then, to the bonded aggregate 140. As the fluid traverses the via 120, its temperature decreases because it has a finite specific heat. The corresponding temperature in the bonded aggregate 140 and heat spreader layer 130 of the store as illustrated by curve 160 also declines. This enables to the fluid 121 to continue to deposit heat into the store until the heat transfer fluid temperature reaches the minimum of the curve. At that point, the fluid 121 flows to the exit at that minimum temperature.

Over time, the temperature of the medium 140 in the store will increase and resemble curve 170. In this condition, the heat transfer fluid 121 will not initially transfer much heat as it enters the store 140. It will have to traverse some longitudinal distance before the temperature in the store drops to a sufficient level for heat transfer to begin. Then, as before, heat will flow from the fluid to its surroundings and the fluid 121 will eventually approach the minimum temperature of curve 170. It will exit the store at that temperature.

In the preferred embodiment, the thermal store of FIG. 1 will be charged until the profile approaches curve 180 of FIG. 2. At this point, the heat transfer from the fluid 121 will occur in roughly that latter half of the store. Continuing to charge beyond this point is possible and no particular harm will come to the store, but for the purpose of constructing a system for efficient round-trip storage and retrieval system for electrical energy, the increased thermal charge will lead to inefficiencies. The inefficiency is manifest through the creation of entropy when low temperature fluid is re-injected to the system during discharging. By stopping at curve 180, the fluid 121 in the discharge process enters with a relatively small temperature difference relative to the thermal store. The fluid 121 extracts heat as it traverse curve 180 (now from right to left) until it saturates near the maximum temperature of curve 180.

Figure 3:
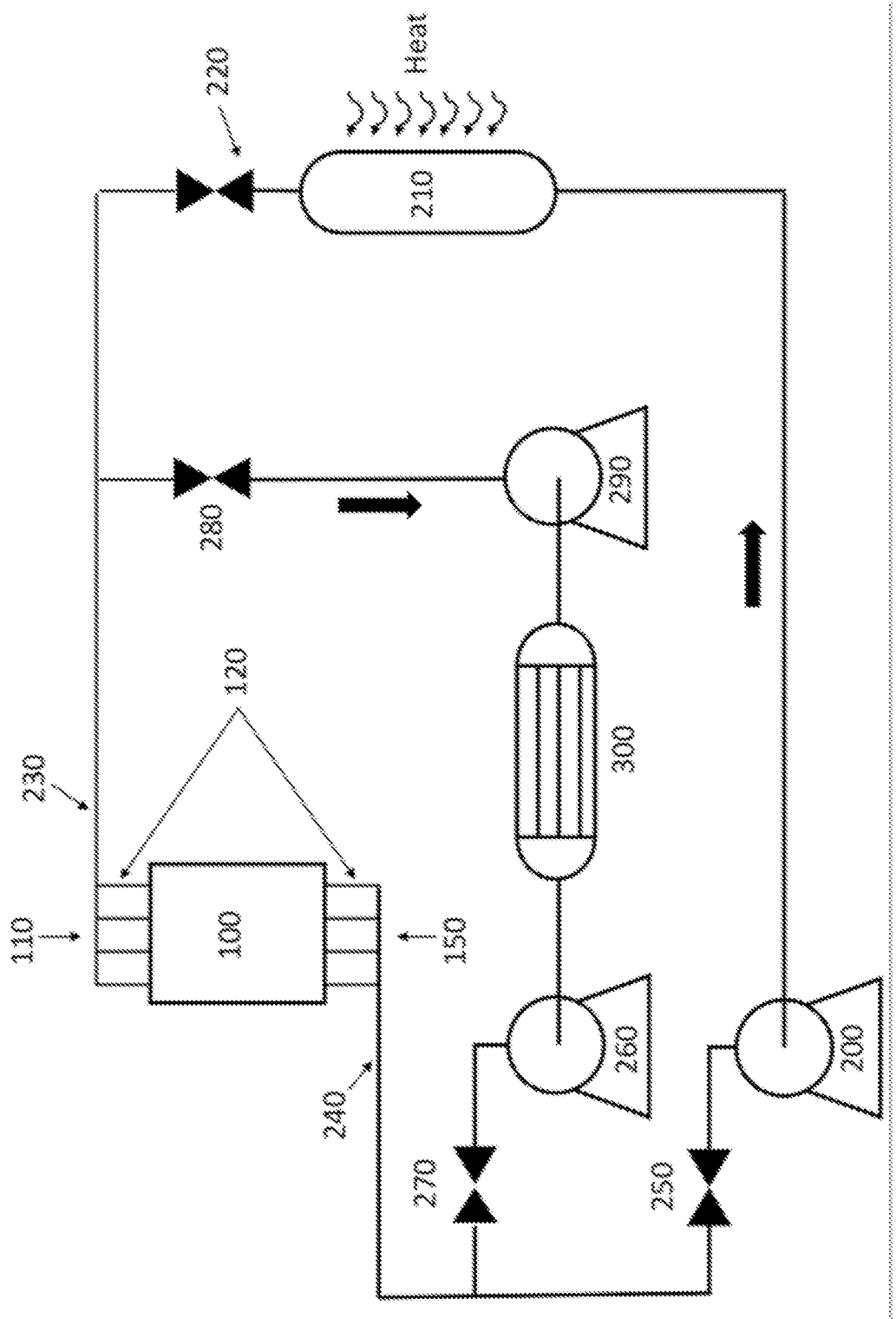
FIG. 3 depicts a system according to the invention using the thermal energy store of FIG. 1.

Discharging proceeds much like charging except that the curves now progress from 180 to 170 to 160. For much of the discharge cycle, the heat transfer fluid is able to exit at nearly the same temperature as the fluid that entered the storage system during the charging phase. This enables the storage system of FIG. 1 to retrieve the stored thermal energy with relatively limited entropy creation and thus high efficiency. It will be noted that over long time scales, the curve 180 will eventually reach an equilibrium where the temperature gradient vanishes. By designing the store with a sufficiently long length, the effect of this equilibration can be made small enough that it does not materially impact storage performance over the time scale of days or weeks. In cases where it is desirable to have even longer term storage, a network of storage units can be deployed with associated valves to build a discretized version of the curves illustrated in FIG. 2 and thereby prevent the equilibration of heat beyond each discrete storage system. FIG. 3 is an example of a system according to the invention using the thermal energy store of FIG. 1. The store is denoted by its housing 100, headers 110, 150 and vias 120 in the drawing. The store and other components of the system of FIG. 3 are coupled by piping, conduits, tubing and other structures (here, again, collectively, "tubes") of the type known in the art suitable for defining a fluid path (or circuit) and carrying the heat transfer fluids along the paths illustrated in the drawings and described below. The path and those structures are depicted as tubes in FIG. 3 by solid lines and directional arrows as per convention.

Consider, first, the process for charging the thermal store. The pump 200 moves the heat transfer fluid through pipes to a heat collector 210. The fluid gains heat and increases in temperature in a heat collector 210, which is of the conventional type known in the art as adapted in accord with the teachings hereof.

The heat collector 210 connects to valve 220, which is open in the charging state. Valve 220 connects to valve 280 which remains closed during the charging cycle. The heat transfer fluid flows through pipe 230 and connects to header 110 of the thermal store. As described above, heat is transferred from the heat transfer fluid into the bulk medium of the thermal store as the fluid flows through tubes 120 to the header 150. The aforementioned valves 220, 280, as well as the others shown in FIG. 3 and discussed herein, are of the conventional type known in the art as adapted in accord with the teachings hereof.

The header 150 connects to external tubes 240, which may be arranged in a piping network or otherwise as is within the ken of those skilled in the art in view of the teachings hereof. Those tubes convey the heat transfer fluid to valves 270 and 250. During the charging cycle valve 270 remains closed and valve 250 is open. Valve 250 conveys the heat transfer fluid to the pump 200 which completes the cycle.

During discharging, valves 250 and 220 are closed and valves 270 and 280 are open. The fluid path illustrated in the diagram depicts a Rankine cycle for converting the stored thermal energy into electrical energy. Beginning with the pump 260, the fluid flows through 270 to the piping network 240 and into the thermal store. As described above, when the heat transfer fluid traverse the thermal store, it will increase in temperature until it is nearly the same temperature as the fluid used to charge the store. The fluid will then flow from the store through header 110 and tubes 230 (which, too, may be arranged in a piping network or otherwise) to valve 280. This valve will convey the fluid to turbine 290, which is of the conventional type known in the art as adapted in accord with the teachings hereof. The turbine extracts mechanical energy from high temperature fluid and lowers its temperature. The mechanical energy can be used directly or to power an electrical generator (not shown) of the conventional type known in the art as adapted in accord with the teachings hereof. Having transferred its usable energy, the low temperature fluid exits turbine 290 and enters condenser 300, e.g., of the type known in the art as adapted in accord with the teachings hereof.

The condenser 300 transmits heat from the fluid to an external heat sink such as the air via a cooling tower, e.g., of the type known in the art as adapted in accord with the teachings hereof. During this process the fluid condenses to its liquid state. From the condenser, the liquid fluid enters pump 260, too, of the conventional type known in the art as adapted in accord with the teachings hereof, and completes the cycle.

Operation of the pumps, valves and other active components of the system of FIG. 3, as described above and elsewhere herein, during charging and discharging cycles or otherwise may be effected "by hand" by an operator (not illustrated), by machine, e.g., by a digital data processor, PLC or other control devices or combination thereof (not illustrated), or by a combination of man and machine, all as per convention in the art as adapted in accord with the teachings hereof.

The embodiment of the invention shown in FIG. 1 and described above provides a system that is well suited for rapidly charging and discharging the thermal store. The rate of charge can be tuned with the thickness of the sand layers, the thickness of the graphite, and the density of tubes. However, increasing the charging rate at a fixed temperature difference will increase the cost of the system. Similarly, reducing the charging rate will reduce the cost of the system. As an example, consider the sand layer. Doubling the thickness will enable the system to store twice as much thermal energy but the charging rate will fall by a factor of two. The geometry illustrated in FIG. 4 provides a way to maintain the charging rate as the thickness of the sand layer increases.

Described above and illustrated in the drawings are thermal energy stores and methods of operation meeting the objects set forth previously, as well as system incorporating those stores and using those methods. It will be appreciated that the illustrated embodiments are only examples of the invention and that other embodiments differing from those shown and described herein are encompassed by the invention, as well. Thus, for example, while preceding examples describe some selected components of systems according to the invention, it will be understood by those practiced in the art that other components may be included in the fluid paths of these systems instead or in addition to those shown in the drawings and discussed above, including, for example, pressure and temperature sensors, safety valves, piping and fittings, filters, oil separation devices and other instruments needed to support the operation of the particular choices of components in the system.

I claim:

1. A thermal storage system, comprising
A. one or more fluid-transport vias suitable for carrying a heat transfer fluid therein,
B. a layer of compressed expanded graphite disposed on a bonded aggregate material, the bonded aggregate material comprising a composite of sand and sodium metasilicate,
C. the one or more fluid-transport vias disposed in thermal coupling with at least one of the bonded aggregate material and the layer of compressed expanded graphite;
wherein the one or more fluid-transport vias are disposed adjacent to and in thermal coupling with the layer of compressed expanded graphite, and
the layer of compressed expanded graphite is disposed adjacent to and in thermal coupling with a layer of the bonded aggregate material,
wherein the layer of bonded aggregate material comprises perforations that extend therethrough obliquely to a plane of that layer of bonded aggregate material.

2. The thermal storage system of claim 1, wherein the layer of compressed expanded graphite comprises planes of graphite that are perpendicular to a direction of compression of the layer of compressed expanded graphite.

3. The thermal storage system of claim 1, wherein the composite is hardened by exposure to carbon dioxide gas.

4. The thermal storage system of claim 1, wherein the layer of the bonded aggregate material is compacted.

5. The thermal storage system of claim 1, wherein the one or more fluid-transport vias comprise stainless steel.

6. The thermal storage system of claim 5, wherein the one or more fluid-transport vias comprise stainless steel tubes.

7. The thermal storage system of claim 1, wherein the one or more fluid-transport vias are suitable for carrying a heat transfer fluid comprising any of carbon dioxide, a eutectic mixture, heat transfer oils, perfluoropolyether (PFPE), hydrocarbons and refrigerant gases.

* * * * *